Feb. 24, 1931.  J. KOSTEN  1,794,181
FEED MIXER
Filed Aug. 23, 1929
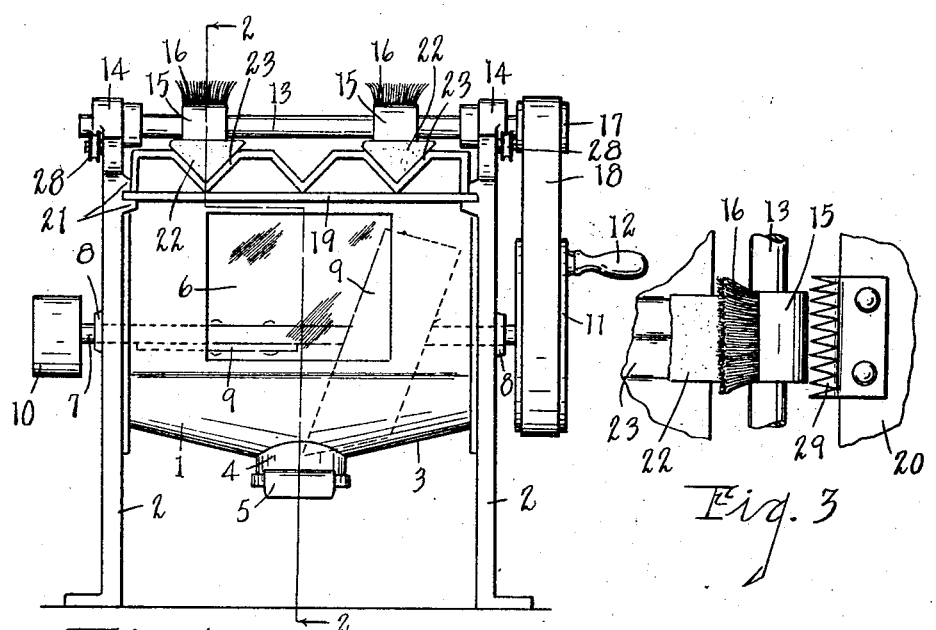
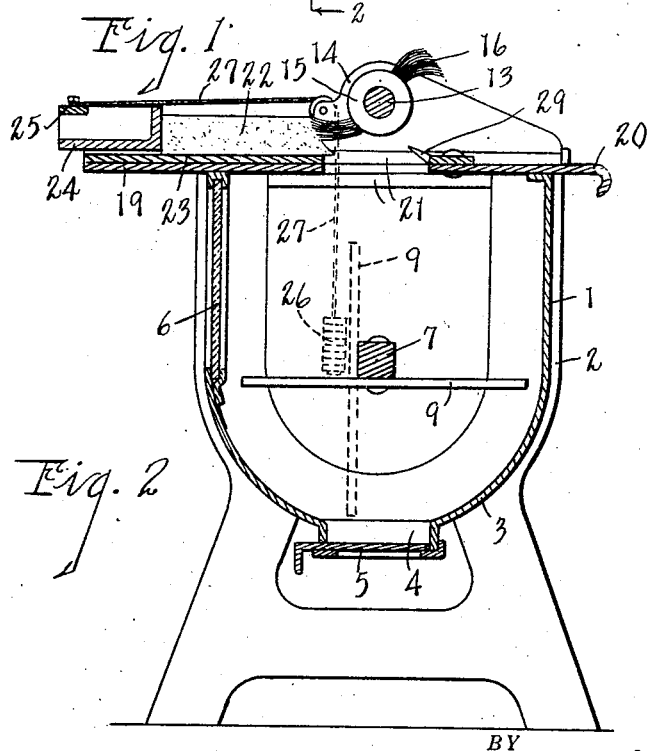
INVENTOR
Johannes Kosten
BY
Chappell & Earl
ATTORNEYS Patented Feb. 24, 1931

1,794,181

UNITED STATES PATENT OFFICE

JOHANNES KOSTEN, OF GRAND RAPIDS, MICHIGAN

FEED MIXER

Application filed August 23, 1929. Serial No. 388,022.

In the preparation of feed for poultry it is deemed desirable to mix tallow or like animal fats with the ground feed and, owing to the character of the material, it is difficult to produce a uniform mixture. Heretofore attempts have been made to distribute the fat material to the ground grain or feed by melting the fat and passing through a screen in such a manner that drops are formed to fall into the cereal portion of the feed.

This, however, is a very slow process and uniform mixture is not possible.

It is the main object of this invention to provide a machine whereby the fatty material is disintegrated and delivered into the cereal portion of the feed simultaneously agitating the same so that a comparatively uniform distribution of the fatty material with the other material results.

A further object is to provide a machine having these advantages which is of relatively large capacity.

A still further object is to provide a machine of this character which is economical to produce and easy to operate.

Objects pertaining to details and economies of construction and operation of my invention will definitely appear from the description to follow. The invention is defined in the claims.

A machine which is a preferred embodiment of my invention is clearly illustrated in the accompanying drawing, in which:

Fig. 1 is a front elevation of my feed mixing apparatus, parts of the fatty material feed means being omitted.

Fig. 2 is a vertical section on line 2—2 of Fig. 1.

Fig. 3 is a fragmentary plan view.

In the embodiment illustrated in the accompanying drawing the mixing tank 1 is supported by the end members 2 which constitute pedestals. The tank 1 has a bottom 3 of curved cross section and inclined from each end to a central discharge 4 provided with a slidable closure 5. The tank has a window 6 at one side through which the contents may be inspected.

Longitudinally of the tank I mount an agitator shaft 7 which is supported in bearings 8 in the end members 2. On this shaft I mount agitator blades 9 disposed in an oppositely inclined and also in a quarterly relation. The ends of the blades are inclined and the angle of inclination corresponds to the inclination of the bottom so that as the agitator rotates the blades sweep close to the inclined bottom. The blades being inclined, one end sweeps toward the center thereof so that the entire contents of the tank are stirred or agitated.

The shaft is provided with a belt pulley 10 at one end and a pulley 11 at the other having a crank 12. At the top of the tank I mount a disintegrator shaft 13, the end members 2 being provided with bearings 14 for this shaft. On the shaft 13 I mount disintegrating brushes 15 having relatively long filaments or strands 16 of wire. This shaft is provided with a pulley 17 connected by the belt 18 to the pulley 11 so that the disintegrator and agitator are driven in unison.

The cover members 19 and 20 are supported in slides 21 so as to be adjusted relative to each other, leaving a space or opening below the disintegrator. The material to be disintegrated, such as tallow or other solidified fats indicated at 22, is preferably in the form of bars and is supported in trough-like holders 23 disposed transversely of the disintegrator and in alinement with the disintegrator brushes. These holders are mounted on the cover member 19.

The feed members 24 are slidable in the troughs and are advanced by means of the feed bar 25 engaging the rear ends of these feed members and urged forwardly in the holders by means of the weights 26 connected to the cable 27 carried over the pulleys 28 so that the material is gradually advanced toward the disintegrating brushes.

On the cover member 20 I mount clearing combs 29 which are arranged so that as the brushes rotate they are brought into engagement with the clearing combs, the disintegrated material adhering to the brushes being knocked or stripped off by this engagement and falling into the mixing tank. The brushes engage the material to be disintegrated with a downward stroke so that it is thrown into the mixing chamber and upon the ground cereal or other material with which it is to be mixed. As this cereal is simultaneously stirred by the agitator the disintegrated fatty matter is effectively mixed with the other feed.

My machine is of large capacity and is easily operated. I have not attempted to illustrate or describe various modifications and adaptations which I contemplate as it is believed that this disclosure will enable those skilled in the art to embody or adapt my improvements as may be desired.

Having thus described my invention what I claim as new and desire to secure by Letters Patent is:

1. The combination of a mixing tank, an agitator disposed within said tank, rotating disintegrator brushes mounted above said agitator, holders for material to be disintegrated, feed means for feeding the material forwardly in said holders into operative relation to the brushes, and clearing combs disposed oppositely to said holders whereby the disintegrator brushes may be rotated to engage the material to be disintegrated with a downward stroke and the clearing combs with an upward stroke.

2. The combination of a mixing tank, an agitator disposed within said tank, rotating distintegrator brushes mounted above said agitator, holders for material to be disintegrated, and clearing combs disposed oppositely to said holders whereby the disintegrator brushes may be rotated to engage the material to be disintegrated with a downward stroke, and the clearing combs with an upward stroke.

3. In an apparatus of the class described, the combination with a mixing tank, an agitator within said tank, a holder for tallow or the like above the tank, a disintegrating brush mounted in operative relation to said holder to discharge the disintegrated material into the tank, and a cleaning comb for said brush disposed over the tank so that the material removed from the brush will fall into the tank.

4. The combination of a mixing tank, an agitator within said tank, a disintegrator brush mounted above said agitator, a holder for material to be disintegrated disposed at the side of the disintegrator brush so that the disintegrator brush engages the material to be disintegrated with a downward stroke, and a clearing means for said brush disposed on the opposite side thereof so as to be engaged by the brush on its upward stroke or movement.

5. The combination of a mixing tank, an agitator within said tank, a disintegrator disposed above the agitator, means for supporting and feeding the material to be disintegrated such as tallow or solidified fatty material to the disintegrator brush, means for clearing the brush disposed so that the material dislodged thereby will drop into the tank, and means for driving said agitator and disintegrator simultaneously.

6. The combination of a tank having transverse cover slides, a disintegrator shaft mounted in a plane above the plane of the cover slides, said disintegrator shaft being provided with a plurality of wire brushes having relatively long strands, cover members mounted in said cover slides for adjustment relative to each other with their inner edges in spaced relation providing an opening below the disintegrator shaft, a plurality of trough-like holders on one of said cover members disposed transversely of the receptacle in alinement with the brushes, combs mounted on the other cover member in alinement with said brushes, and feed means operatively associated with said holders.

7. The combination of a tank, a disintegrator shaft disposed above said tank, a rotating disintegrator brush on said shaft having relatively long strands, means for feeding the material to be disintegrated to said brush, and a clearing comb disposed opposite to said feeding means, said brush being rotated to engage the material to be disintegrated with a downward stroke and the clearing comb with an upward stroke.

In witness whereof I have hereunto set my hand.

JOHANNES KOSTEN.